United States Patent [19]

Henderson

[11] 4,225,298
[45] Sep. 30, 1980

[54] APPARATUS FOR REMOVING WARPS OR SURFACE IRREGULARITIES FROM POLYVINYL PHONOGRAPH RECORDS

[76] Inventor: Norman J. Henderson, 2045 Rosemount Ave. N.W., Washington, D.C. 20010

[21] Appl. No.: 945,492

[22] Filed: Sep. 25, 1978

[51] Int. Cl.² ................................................ B29C 17/00
[52] U.S. Cl. .......................................... 425/11; 264/36; 264/107; 425/12; 425/394; 425/810
[58] Field of Search .................... 425/11, 12, 394, 810; 264/107, 36

[56] References Cited

U.S. PATENT DOCUMENTS

| 2,388,127 | 10/1945 | Downing | 425/11 |
| 2,578,457 | 11/1951 | Somers | 425/11 |
| 4,145,169 | 3/1979 | Shows | 425/11 |

FOREIGN PATENT DOCUMENTS

| 4312655 | 8/1969 | Japan | 425/810 |
| 49-42668 | 11/1974 | Japan | 425/810 |

*Primary Examiner*—James H. Derrington
*Attorney, Agent, or Firm*—Lane, Aitken & Ziems

[57] ABSTRACT

Method and apparatus for removing warps or surface irregularities from polyvinyl phonograph records by exerting forces vertically and/or laterially on a record. The apparatus includes a plurality of plate-like members which are used to engage with the lead-in lips and/or label regions on one or more records and to apply appropriate forces. The effectiveness of the method and apparatus is enhanced by the application of moderate heat from an external source.

9 Claims, 7 Drawing Figures

APPARATUS FOR REMOVING WARPS OR SURFACE IRREGULARITIES FROM POLYVINYL PHONOGRAPH RECORDS

BACKGROUND OF THE INVENTION

The present invention relates a method and apparatus for removing warps or surface irregularities from phonograph records, and more particularly, records made of polyvinyl materials such as used in modern, long-playing, high fidelity records. Such records are often delivered by a supplier to the end user in a moderately to severely warped condition. Such conditions generally result from a combination of factors, including inadequately controlled manufacturing processes, temperature variations and stresses during shipping and storage, and inadequate storage facilities or conditions maintained by the supplier. Once in the hands of the end user or consumer, such planar records are subject to further warpage and deterioration with usage and due to further inadequate storage facilities and conditions.

Warpage of modern polyvinyl records presents problems which did not exist with the older type, less pliable 78 RPM records. Because modern, sophisticated, high fidelity sound reproduction equipment is capable of following and reproducing all variations on a record, including warps, even very small non-planar variations in the surface of a record adversely affect the fidelity of the reproduced sound. In addition to the loss of fidelity in the sound reproduction, subsonic signals can be generated by even a slightly warped record which can drive a hi-fi power amplifier into a clipping region further distorting fidelity and potentially causing damage to loud-speakers. Extreme warps can render a record unplayable. Even with turntable, tonearm and cartridge combinations of extreme sophistication, unacceptable quality sound reproduction occurs with record warpage.

Subsonic signals are also reported to be capable of causing adverse physiological effects known generically as flicker vertigo, which can produce spatial disorientation or blackout if the signals are of sufficient strength and duration. Reportedly, even minute warps in a record can generate such subsonic signals through an appropriate amplifing system.

Although U.S. Pat. No. 2,388,127 discloses an apparatus for flattening disc records, it is totally inapplicable to modern records since, for example, it utilizes two superposed plates which engage the playing surface of the record. Although this technique would be appropriate for an earlier generation record it would severely damage a modern polyvinyl record.

SUMMARY OF THE INVENTION

Accordingly, it is an object of the present invention to provide a method and apparatus for removing warps or surface irregularities in polyvinyl records.

It is a further object of the present invention to provide apparatus which is inexpensive and simple to use.

Toward the fulfillment of these and other objects of the present invention, a plurality of plate-like members are provided which are adapted to engage with the lead-in lips on one or more records and to clamp one or more records therebetween for the application of appropriate forces to the records. The plate-like members are provided with centering apertures to facilitate record registration between the plates, and releasable and adjustable clamping means are provided. The plate-like members are further provided with means to engage with the label portions of the record clamped therebetween but not to engage with the playing surfaces of the records. By appropriate tightening and adjustment of the clamping means, record warpage and surface irregularities may be removed. In one embodiment of the invention, the plate-like members are bowed to permit the application of lateral as well as vertical forces to a record. The application of moderate heat from an external source facilitates warpage removal.

DESCRIPTION OF THE PREFERRED EMBODIMENTS

Figure 1:
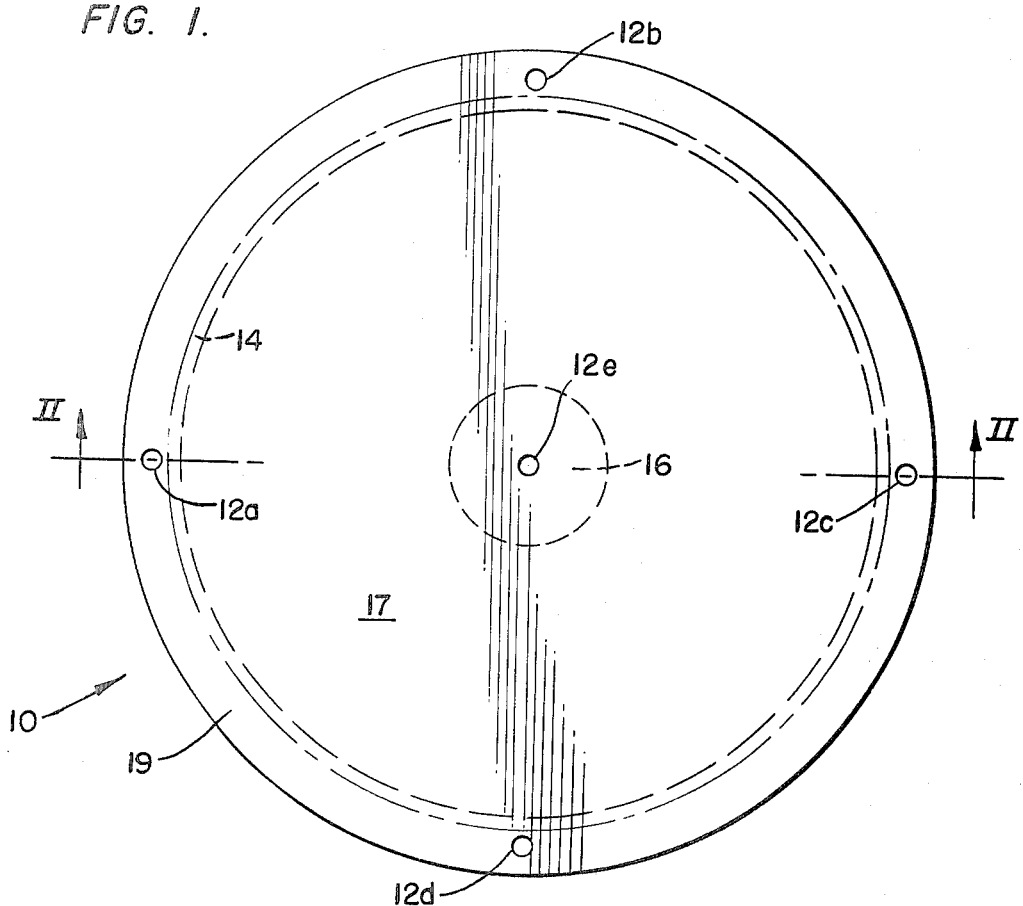
FIG. 1 is a plan view of a plate-like member used in the present invention.
Figure 2A:
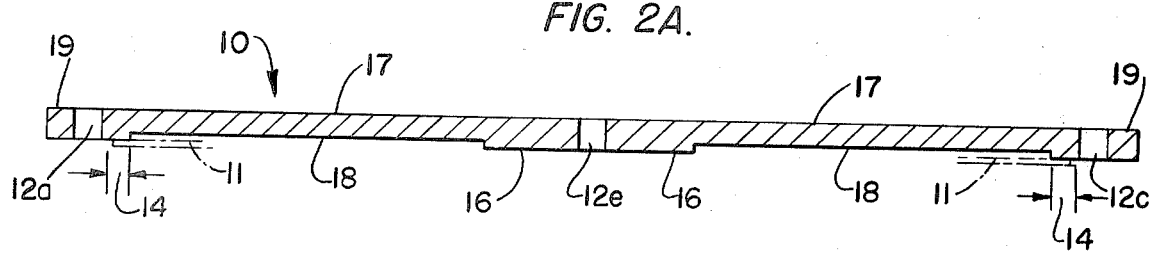
FIG. 2A is a partial cross-sectional view along line II—II of FIG. 1.

Referring to FIG. 1 of the drawings, the reference numeral 10 refers in general to a plate-like member utilized in the apparatus according to the present invention. The member 10 is generally circular in shape and has a plurality of apertures 12a, 12b, 12c, and 12d disposed about its outer periphery in an equalangularly spaced relationship and extending through the member for receiving shafts or bolts as will be explained in detail later. The member 10 also includes a central aperture 12e which is also adapted to receive a shaft or a bolt. As shown in FIG. 2A the underside of the member 10 includes an elevated lip area 14 and an elevated area 16, both elevated with respect to the generally planar undersurface of the member 10. The plate-like member 10 has an upper exterior surface 17 and a lower exterior surface 18 which includes circular elevated regions 16 and 14 disposed concentrically about the central aperture 12e. In a preferred embodiment, the diameter of the elevated region 16 corresponds approximately to the central label region on a polyvinyl record, and is typically in the range of 4.00" to 4.25". The non-elevated portion of the lower surface 18 is selected to correspond to the playing surface of a polyvinyl record 11 positioned parallel to the member 10 and with its center hole aligned with the hole 12e. With this arrangement there can be no engagement or contact between the surface 18 and the playing surface of a record with the member 10 positioned over the record. The outer elevated region 14 of the lower surface preferably has a width in the range of 0.125" to 0.200", and is selected to engage with the outer edge or lead-in lip of the record. The portion 19 of the member 10 designates the outer periphery portion of the member which contain the apertures or holes, 12a, 12c, etc. as also shown in FIG. 1.

Figure 2B:
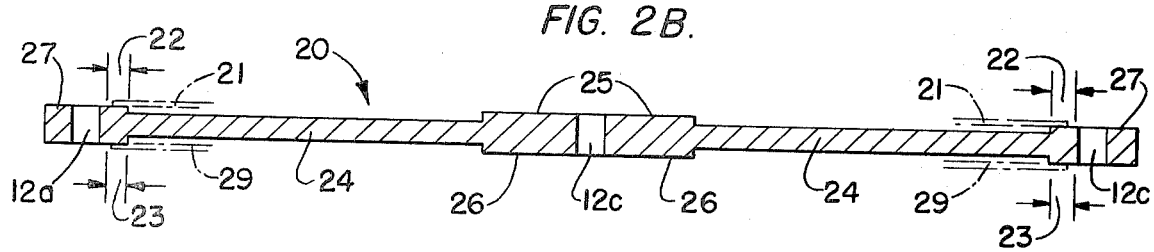
FIG. 2B is a view similar to FIG. 2A but illustrates another plate-like member used in one embodiment of the invention.

FIG. 2B illustrates a similar view of another plate-like member 20 used in one embodiment of the present invention. The member 20 also includes the central aperture 12e, and the peripheral apertures 12a, and 12c and other peripheral apertures (not shown in the view in FIG. 2B). The plate-like member 20 includes a region 24 which corresponds to the playing surface of a record (e.g. 21,29) positioned parallel to the member 20 and with its central hole aligned with the central hole 12e. Two elevated regions 22 and 25 are provided on the upper surface of the member 20, and two corresponding elevated regions 23 and 26 are provided on the lower surface of the member 20. The elevated regions 22 and 23 correspond dimensionally and functionally to the elevated region 14 of FIG. 2A, and the elevated regions 25 and 26 correspond dimensionally and functionally to the elevated region 16 of FIG. 2A. Similarly, portion 27 of the member 20 corresponds to the element 19 of FIG. 2A.

Figure 2C:
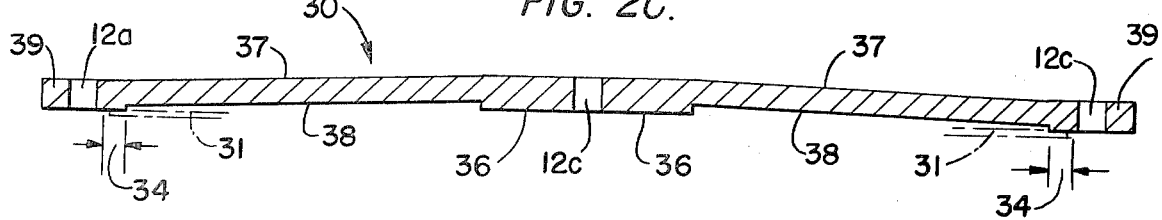
FIG. 2C is a view similar to FIG. 2A but illustrates a further plate-like member used in one embodiment of the invention.

FIG. 2C illustrates another plate-like member 30 used in another embodiment of the invention and which corresponds generally to the member 10 of FIG. 2A. The elements 31, 34, 36, 37, 38 shown in FIG. 2C correspond to the elements designated by the comparable numerals 11, 14, 16, 17, 18 in FIG. 2A. The difference between the member 30 and the member 10 is that the member 30 is bowed so that the elevated surface 36 is vertically displaced relative to the elevated surface 34 by approximately 1/32" to ⅛" when the member 30 is not subjected to externally applied stresses or forces.

Figure 3:
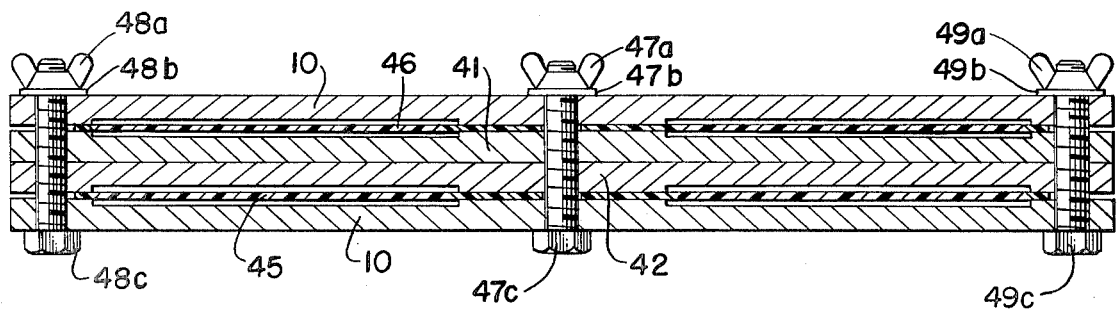
FIG. 3 is a cross-sectional view showing a first embodiment of apparatus of the invention as used in operation.

FIG. 3 is a cross-sectional view of a first embodiment of apparatus according to the present invention illustrating the method of the invention. The apparatus of FIG. 3 is adapted to hold two records 45 and 46 having warps or surface irregularities desired to be removed. Upper and lower exterior, plate-like members 10 are provided. Two interior plate-like members 41 and 42 are also provided, each corresponding substantially to the plate-like member 10 except that the thickness of the internal members 41 and 42 need not be as great as the thickness of the exterior members 10, and for example, need only be 50% as thick as the exterior member 10. The bottom, exterior plate-like member 10 is the same as the upper, exterior plate-like member 10 previously described and the diameters of both members are slightly greater than that of the records 45, 46 so that the peripheral apertures 12a, 12b, 12c, and 12d clear the outer edges of the records.

In operation, a bolt or spindle 47c is inserted through the central aperture of the bottom member 10. Next, a record 45 having warps is inserted in position with the bolt 47c extending through its center hole so that the record rests on the record engaging surfaces of the member 10. Then, the internal member 42 is inserted onto the bolt or spindle 47c with its record engaging surface appropriately positioned to engage with the record 45. Next, the other internal member 41 is inserted onto the bolt or spindle 47c with its record engaging surface facing upwardly and a second record 46 having warps is positioned on the record engaging surface of the member 41 with the bolt 47c extending through the center hole of the record 46. Finally, the upper member 10 is inserted onto the stack of records and plate-like members with the bolt 47c extending through the center aperture thereof. Next, a washer 47b is inserted onto the spindle or bolt 47c and a wing nut 47a is threaded onto the bolt. Before the wing nut 47a is tightened, it is necessary for bolts 48c, 49c to be respectively inserted each through one set of apertures about the periphery of the apparatus. These apertures about the periphery of each member correspond to the apertures 12a, 12b, 12c and 12d of FIG. 1, and must first be brought into alignment and registration with each other so that the bolts may be inserted therethrough. It is, of course, not necessary to use exactly four holes or apertures as shown in FIG. 1, but preferably three or more holes or apertures spaced equiangularly about the periphery should be used. The apertures about the periphery may be appropriately aligned by rotating the various members 10, 41, 42, 10, about the central bolt or spindle 47c until one set of apertures such as aperature 12a, align so that the bolt 48c may be inserted. A washer 48b is then inserted onto the threads of the bolt 48c and a wing nut 48a is threaded on to the bolt 48c. Similarly, a bolt 49c is then inserted into another set of aligned peripheral apertures, such as aperture 12c, a washer 49b is placed on the bolt and a wing nut 49a is threaded onto the bolt 49c. Further bolts (not shown in FIG. 3) are then inserted in the other sets of peripheral apertures 12b and 12d and washers and wing nuts are threaded thereon.

With this arrangement, the bolts and wing nuts are then successively tightened equally, starting with the center bolt and wing nut 47c and 47a. As the bolts and wing nuts are tightened, the warpage of the records 45 and 46 will be removed due to the pressures and forces applied to the records by the record engaging surfaces of the plate-like members of the apparatus.

Figure 4:
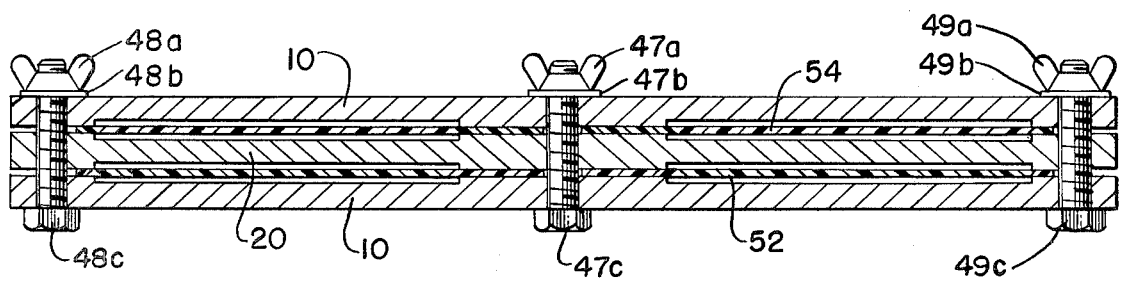
FIG. 4 is a cross-sectional view similar to that in FIG. 3 but showing a second embodiment of apparatus of the invention.

FIG. 4 shows an alternative embodiment of the apparatus of FIG. 3 for performing the method of the invention. The difference as compared to the apparatus of FIG. 3 is that the two interior plate-like members 41 and 42 of FIG. 3 have been replaced by the single interior member 20 previously described with reference to FIG. 2B, and having upper and lower record engaging surfaces. The upper and bottom, exterior, plate-like members in FIG. 4 are each designated by numeral 10 and each correspond to the member 10 described with reference to FIG. 2A.

With this arrangement, it is seen that the apparatus is assembled by insertion of the center bolt or spindle 47c through the center aperture of the lower exterior member 10. A record 52 is then inserted onto the center bolt 47c followed by the central plate-like member 20, followed by a second record 54, followed by the upper plate-like member 10. A washer 47b is then inserted onto the upper portion of the bolt or spindle 47c and a wing nut 47a is threaded onto the bolt 47c. After this has been done, bolts 48c, 49c and other bolts (not shown) are inserted through the peripheral apertures in the apparatus after the peripheral apertures have been aligned as previously described with reference to the embodiment of FIG. 3. Correspondingly, washers 48b, 49b, etc. and wing nuts 48a, 49a, etc. are inserted and threaded onto the peripheral bolts 48c, 49c, etc. In operation, the central bolt and wing nut 47c is first tightened, and then the peripheral bolts and wing nuts 48c, 48a, 49c, 49a, etc. are then successively tightened. As the various wing nuts are successively tightened, the warpage and surface irregularities on the records 52 and 54 are removed.

Figure 5:
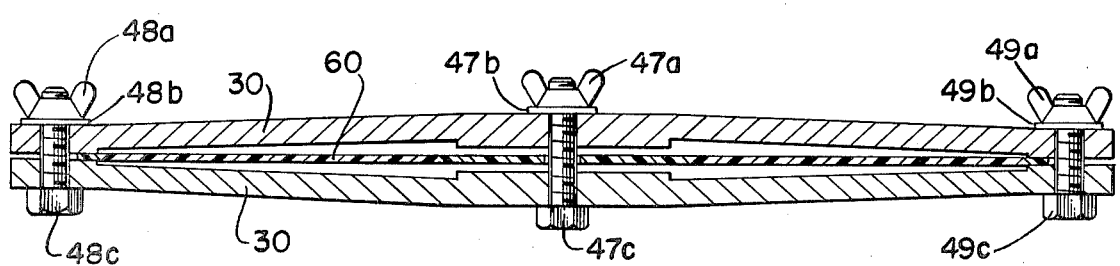
FIG. 5 is a further cross-sectional view similar to that in FIG. 3 but showing a third embodiment of apparatus of the invention.

A still further embodiment of apparatus according to the present invention is shown in FIG. 5 in which upper and lower exterior plate-like members 30 are used. As in the case of the other embodiments, the central bolt or spindle 47c is first inserted through the center aperture of the lower plate-like member 30, a warped record 60 is inserted onto the bolt 47c, and the upper plate-like member is then inserted onto the center bolt 47c. Next, a washer 47b is inserted onto the bolt 47c and a wing nut 47a is threaded onto the bolt 47c. As in the case of the other embodiments, the peripheral apertures are then aligned by appropriate relative rotation of the upper member 30 and the lower member 30 and bolts 48c, 49c, etc. and wing nuts 48a, 49a, etc. are inserted on the bolts 48c, 49c, etc.

In operation of the embodiment of FIG. 5, the peripheral bolts and wing nuts are first tightened to cause the record engaging surfaces of the upper and lower members 30 to engage the lip or lead-in portion of the record 60 clamped therebetween. Next, the central bolt 47c and wing nut 47a are tightened in order to cause the warpage or surface irregularities in the record 60 to be removed. It is noted that due to the bowed condition of the members 30, as the central bolt and wing nut are tightened, lateral (i.e., horizontal) forces, as well as vertical forces are applied to the record 60.

It has been found that moderate external heat from an external heat source (not shown) may be advantageously used with the embodiments in FIGS. 3, 4, and 5. The application of moderate external heat causes the temperature of the apparatus and the record or records therein to increase. This facilitates the removal of warpages and surface irregularities from the record(s) by causing the record(s), to become more pliant. Also, if the external heat source is removed or turned off and the temperature of the apparatus and the record(s) therein is permitted to return to ambient temperature before the record(s) are removed from the apparatus, it has been found that improved warpage removal is achieved. Any moderate external heat source can be used to achieve this effect, including a light bulb, sunlight, radiator, electrical heating coil, or warm oven.

With the apparatuses of FIG. 3 and FIG. 4, it is also possible, of course, to add further internal plate-like members to allow simultaneous warpage removal from a larger number of records.

It is also noted that the washers used with the apparatus preferably should be selected to prevent unnecessary build-up pressure stresses within the apparatus. For example, the washers under the wing nuts on the various bolts should preferably be made of teflon, graphite, molybdenum disulphide, or other suitable materials having low frictional characteristics which would permit lateral sliding movement or expansion, while maintaining vertical or tightening pressures or forces as the various wing nuts and bolts are tightened.

Of course, all of the bolts, spindles, wing nuts, etc. and other elements involved in the application of vertical pressures or forces should have coefficients of expansion less than that of the materials used in the various plate-like members in order to allow for the use of an external heat source with the apparatus. Correspondingly, the plate-like members should preferably be constructed of materials which have coefficients of expansion at least equal to or greater than that of the polyvinyl materials used in the phonograph records.

It will also be noted by those skilled in the art that the apparatus of the present invention is readily adapted to be changed dimensionally, and, for example, with the addition of accessories so that warps or surface irregularities may be corrected in polyvinyl phonograph records of varying sizes such as standard 12" records, 10" records, 7" records as well as other size records.

Of course, the invention may be embodied in other specific forms without departing from its spirit or essential characteristics. The present embodiments, are therefore, to be considered in all respects as illustrative and not restrictive, the scope of the invention being indicated by the claims rather than by the foregoing description, and all changes which come within the meaning and range of the equivalence of the claims are therefore intended to be embraced therein.

What is claimed is:

1. Apparatus for removing warps or other surface irregularities from at least one polyvinyl phonograph record comprising:

first and second plate-like members, each having a center aperture and two elevated circular concentric surfaces on one face thereof, one of said circular surfaces of each member being adapted to engage with the lead-in lip of a record disposed between said members and in a coaxial relationship with said members, the other of said circular surfaces of each member being adapted to engage with the label portion of said record, said circular surfaces preventing engagement of the remaining portions of said members with the playing surface of said record; and clamping means for applying variable axial forces to said record through said members to clamp said record between said members.

2. Apparatus according to claim 1, wherein said clamping means comprises a plurality of apertures located about the periphery of each of said members and extending therethrough, said peripheral apertures on one member being adapted to align with said peripheral apertures on the other member; a plurality of bolts adapted to be inserted through said aligned peripheral apertures and center apertures of said members, and means for threadedly engaging said bolts to apply variable forces to said members.

3. Apparatus according to claims 1 or 2, further comprising a third plate-like member having at least one face thereof provided with two elevated circular concentric surfaces, one of said circular surfaces being adapted to engage with the lead-in lip of a record, the other of said circular surfaces being adapted to engage with the label portion of a record, and having a center aperture therethrough, said third member adapted to extend between said first and second members with at least one record therebetween.

4. Apparatus according to claim 3, wherein said third member has a plurality of apertures located about the periphery thereof and extending therethrough, said peripheral apertures of said interior member being adapted to align with said peripheral apertures of said first and second members, said circular surfaces of said third member being arranged to prevent engagement thereof with the playing surface of a record having the axis of its center hole aligned to extend through the center aperture of said third member.

5. Apparatus according to claims 1 or 2, wherein each of said members is bowed so that the plane defined by the label region engaging surface thereon does not coincide with the plane defined by the lead-in lip engaging surface thereon.

6. Apparatus according to claims 1 or 2, wherein said members comprise materials having coefficients of expansion equal to or greater than the coefficients of expansion of the materials used in said records.

7. Apparatus for removing warps or other surface irregularities from at least one polyvinyl phonograph record comprising:

first and second plate-like members, each having two elevated circular concentric surfaces on one face thereof, one of said circular surfaces of each member being adapted to engage with the lead-in lip of a record disposed between said members and in a coaxial relationship with said members, the other of said circular surfaces of each member being adapted to engage with the label portion of said record, said circular surfaces preventing engagement of the remaining portions of said members with the playing surface of said record;

first clamping means for applying an axial clamping force through said label portion of said record; and second clamping means for applying an axial clamping force through said lead-in lip of said record, said plate-like members being constructed and arranged to apply additional forces to said record in a radial direction upon application of said axial clamping forces.

8. Apparatus according to claim 7 wherein said plate-like members are bowed so that, upon application of said axial forces by said clamping means, said additional radial forces are created.

9. Apparatus according to claim 7 wherein the material forming said plate-like members has a greater coefficient of expansion than the material forming said record so that, upon application of heat to said plate-like members and said record, said additional radial forces are created.

* * * * *